US009062170B2

(12) United States Patent
Nordin et al.

(10) Patent No.: US 9,062,170 B2
(45) Date of Patent: *Jun. 23, 2015

(54) MICROSPHERES

(75) Inventors: Ove Nordin, Sundsvall (SE); Heléne Ström, Matfors (SE); Christina Nyholm, Sundsvall (SE); Claes Hammer, Kungsbacka (SE)

(73) Assignee: AKZO NOBEL N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,490

(22) Filed: May 3, 2011

(65) Prior Publication Data

US 2011/0203756 A1 Aug. 25, 2011

Related U.S. Application Data

(63) Continuation of application No. 11/704,559, filed on Feb. 9, 2007, now Pat. No. 7,956,096.

(60) Provisional application No. 60/772,211, filed on Feb. 10, 2006.

(51) Int. Cl.
| | |
|---|---|
| C08J 9/16 | (2006.01) |
| C08J 9/20 | (2006.01) |
| B01J 13/14 | (2006.01) |
| D21H 17/33 | (2006.01) |
| D21H 21/54 | (2006.01) |

(52) U.S. Cl.
CPC .. C08J 9/20 (2013.01); B01J 13/14 (2013.01); C08J 2203/14 (2013.01); C08J 2333/20 (2013.01); D21H 17/33 (2013.01); D21H 21/54 (2013.01)

(58) Field of Classification Search
CPC .......................................................... C08J 9/20
USPC ............................. 521/56, 50, 143, 144, 150
See application file for complete search history.

(56) References Cited

U.S. PATENT DOCUMENTS

| 3,293,114 | A | 12/1966 | Kenega et al. |
| 3,556,934 | A | 1/1971 | Meyer ........................... 162/169 |
| 3,615,972 | A | 10/1971 | Morehouse, Jr. et al. ........ 156/79 |
| 3,945,956 | A | 3/1976 | Garner ........................ 260/2.5 B |
| 4,133,688 | A | 1/1979 | Sack ............................... 96/87 R |
| 4,287,308 | A | 9/1981 | Nakayama et al. ............. 521/53 |
| 5,125,996 | A | 6/1992 | Campbell et al. |
| 5,155,138 | A | 10/1992 | Lundqvist |
| 5,536,756 | A | 7/1996 | Kida et al. ....................... 521/56 |
| 6,235,394 | B1 | 5/2001 | Shimazawa et al. ...... 428/402.21 |
| 6,235,800 | B1 | 5/2001 | Kyuno et al. .................... 521/51 |
| 6,379,497 | B1 | 4/2002 | Sandstrom et al. |
| 6,509,384 | B2 | 1/2003 | Kron et al. ....................... 521/56 |
| 7,956,096 | B2 * | 6/2011 | Nordin et al. ................... 521/56 |
| 2001/0051666 | A1 | 12/2001 | Kron et al. ..................... 521/131 |
| 2002/0040088 | A1 | 4/2002 | Hauschel et al. |
| 2003/0114546 | A1 * | 6/2003 | Satake et al. .................... 521/50 |
| 2003/0143399 | A1 | 7/2003 | Satake et al. |
| 2003/0228339 | A1 | 12/2003 | El-Nokaly et al. |
| 2004/0249005 | A1 | 12/2004 | Kron et al. |
| 2006/0000569 | A1 | 1/2006 | Kron et al. |
| 2008/0017338 | A1 | 1/2008 | Nordin et al. |

FOREIGN PATENT DOCUMENTS

| EP | 0 348 372 B1 | 12/1989 | ............. B29C 67/22 |
| EP | 0 486 080 B1 | 5/1992 | ................. C08F 2/18 |
| EP | 1 054 034 B1 | 11/2000 | ............... B01J 13/02 |
| EP | 1 059 339 B1 | 12/2000 | ............... C09D 7/12 |
| EP | 1 067 151 B1 | 1/2001 | ................. C08J 9/20 |
| EP | 1 288 272 B1 | 3/2003 | ................. C08J 9/16 |
| EP | 1 408 097 A1 | 4/2004 | ................ C09K 3/00 |
| EP | 1 952 881 A1 | 8/2008 | |
| JP | 62-286534 | 12/1987 | ............... B01J 13/02 |
| JP | 62286534 | * 12/1987 | |
| JP | 63-035891 A | 2/1988 | |
| JP | 2689787 | 8/1997 | ............. D21H 21/22 |
| JP | 2003-105693 | 4/2003 | ............. D21H 21/56 |
| JP | 2003-335995 | 11/2003 | |
| WO | WO 2004/056549 A1 | 7/2004 | .............. B29C 44/34 |
| WO | WO 2004/072160 A1 | 8/2004 | ................. C08J 9/00 |
| WO | WO 2004/113613 | * 12/2004 | |
| WO | WO 2004/113613 A1 | 12/2004 | ............. D21H 21/54 |
| WO | WO 2006/009643 A2 | 1/2006 | ................. B32B 5/16 |
| WO | WO 2006/009643 A3 | 1/2006 | ................. B32B 5/16 |
| WO | WO 2006/068573 A1 | 6/2006 | ................. C08F 2/18 |
| WO | WO 2006/068574 A1 | 6/2006 | ................. C08F 2/18 |
| WO | WO 2006/083041 A1 | 8/2006 | |

OTHER PUBLICATIONS

JP 62-286534, 1987, translation.*
Patent Abstracts of Japan for JP 2003-335995 (publication date Nov. 28, 2003).
Patent Abstracts of Japan for JP 63-35891 (publication date Feb. 16, 1988.
SWE 02129 JP Office Action for Japanese Application No. 2008-554195 dated May 22, 2012.
SWE 02129 JP English language machine translation of Office Action for Japanese Application No. 2008-554195 dated May 22, 2012.
USPTO Non-Final Office Action dated Jul. 24, 2008 relating to case U.S. Appl. No. 11/303,693, filed Dec. 16, 2005.
USPTO Non-Final Office Action dated Apr. 3, 2009 relating to case U.S. Appl. No. 11/303,693, filed Dec. 16, 2005.
USPTO Final Office Action dated Dec. 22, 2009 relating to case U.S. Appl. No. 11/303,693, filed Dec. 16, 2005.
USPTO Non-Final Office Action dated Oct. 30, 2009 relating to case U.S. Appl. No. 11/704,558, filed Feb. 9, 2007.
USPTO Non-Final Office Action dated Aug. 20, 2010 relating to case U.S. Appl. No. 11/303,693, filed Dec. 16, 2005.
USPTO Non-Final Office Action dated Oct. 4, 2010 relating to case U.S. Appl. No. 11/704,558, filed Feb. 9, 2007.

\* cited by examiner

*Primary Examiner* — Irina Krylova
(74) *Attorney, Agent, or Firm* — Alice C. Su

(57) ABSTRACT

The invention relates to thermally expandable thermoplastic microspheres comprising a polymer shell made from ethylenically unsaturated monomers encapsulating a propellant, said ethylenically unsaturated monomers comprising from 40 to 70 wt % of acrylonitrile, from 5 to 40 wt % of methacrylonitrile, from 10 to 50 wt % of monomers selected from the group consisting of esters of acrylic acid, esters of methacrylic acid and mixtures thereof, and said propellant comprising at least one of methane, ethane, propane, isobutane, n-butane and neo-pentane. The invention further relates to the production and use of the microspheres.

15 Claims, No Drawings

MICROSPHERES

The present invention relates to thermally expandable thermoplastic microspheres, production and use thereof, and an aqueous slurry comprising such microspheres.

Expandable thermoplastic microspheres comprising a thermoplastic polymer shell encapsulating a propellant are commercially available under the trademark EXPANCEL® and are used as a foaming agent in many different applications.

In such microspheres, the propellant is normally a liquid having a boiling temperature not higher than the softening temperature of the thermoplastic polymer shell. Upon heating, the propellant evaporates to increase the internal pressure at the same time as the shell softens, resulting in significant expansion of the microspheres. The temperature at which the expansion starts is called $T_{start}$, while the temperature at which maximum expansion is reached is called $T_{max}$. Expandable microspheres are marketed in various forms, e.g. as dry free flowing particles, as an aqueous slurry or as a partially dewatered wet-cake.

Expandable microspheres can be produced by polymerising ethylenically unsaturated monomers in the presence of a propellant. Detailed descriptions of various expandable microspheres and their production can be found in, for example, U.S. Pat. Nos. 3,615,972, 3,945,956, 4,287,308, 5,536,756, 6,235,800, 6,235,394 and 6509384, in EP 486080, EP 1054034, EP 1288272 and EP1408097, in WO 2004/072160, and in JP Laid Open No. 1987-286534.

One important application for expandable microspheres is paper making as described in e.g. U.S. Pat. Nos. 3,556,934 and 4,133,688, JP Patent 2689787, JP Laid Open No. 2003-105693, WO 2004/113613, WO 2006/068573 and WO 2006/068574, and in Ö. Söderberg, "World Pulp & Paper Technology 1995/96, The International Review for the Pulp & Paper Industry" p. 143-145.

Other important applications for expandable microspheres are printing inks, vinyl foams (e.g. plastisols), non-woven and artificial leather.

In some applications it is desirable that the microspheres have a comparatively low $T_{start}$. However, the polymer shell in commercially available microspheres with a low $T_{start}$ are usually made of a monomer mixture comprising halogen containing monomers like vinylidene chloride. Such microspheres usually suffer from high amounts of residual monomers, discolouration and poor resistance to chemicals, like solvents and plasticisers used in artificial leathers and plastisols. Attempts to make microspheres with low $T_{start}$ and high expansion capability without halogen containing monomers have not yet solved these problems satisfactorily It is an object of the invention to provide expandable microspheres with high expansion capability and low $T_{start}$ without high amounts of halogen containing monomers.

It is another object of the invention to provide expandable microspheres with low $T_{start}$, high resistance to chemicals and high brightness.

It is still another object of the invention to provide expandable microspheres useful in paper making or in printing inks, for example as a foaming agent therein.

It is a further object of the invention to provide a process for the production of paper.

It is still a further object of the invention to provide an aqueous slurry comprising expandable microspheres useful in the production of paper.

It has surprisingly been found possible to fulfil these objects by combining a certain monomer composition for the polymer shell with a certain group of propellants.

One aspect of the invention concerns thermally expandable thermoplastic microspheres comprising a polymer shell made from ethylenically unsaturated monomers encapsulating a propellant, said ethylenically unsaturated monomers comprising from 40 to 70 wt % of acrylonitrile, from 5 to 40 wt % of methacrylonitrile, from above 10 to 50 wt % of monomers selected from the group consisting of esters of acrylic acid, esters of methacrylic acid and mixtures thereof, and said propellant comprising at least one of methane, ethane, propane, isobutane, n-butane and neo-pentane.

The ethylenically unsaturated monomers preferably comprise from 45 to 65 wt % of acrylonitrile. If a low $T_{start}$ is of highest priority the content of acrylonitrile is most preferably from 45 to 55 wt %, and if high resistance to chemicals is of highest priority the content of acrylonitrile is most preferably from 55 to 65 wt %. The ethylenically unsaturated monomers further preferably comprise from 10 to 35 wt %, most preferably from 15 to 30 wt % of methacrylonitrile. The ethylenically unsaturated monomers further preferably comprise from 15 to 50 wt %, most preferably from 20 to 40 of monomers selected from the group consisting of esters of acrylic acid, esters of methacrylic acid and mixtures thereof.

It has been found that if the ethylenically unsaturated monomers comprise above 10 wt % of esters of acrylic or methacrylic acid, or mixtures thereof, it is possible to obtain microspheres with high expansion capability and comparatively low $T_{start}$.

Esters of acrylic and methacrylic acid preferably have only one carbon to carbon double bond. It has been found that esters of acrylic acid such as methyl acrylate, ethyl acrylate and butyl acrylate, in particular methyl acrylate and ethyl acrylate, are especially favourable as monomers. The ethylenically unsaturated monomers thus preferably comprise from above 10 to 50 wt %, most preferably from 15 to 50, wt % particularly most preferably from 20 to 40 wt % of monomers selected from the group consisting of esters of acrylic acid. It is preferred if the ethylenically unsaturated monomers comprises from above 10 to 50 wt %, most preferably from 15 to 50, wt % particularly most preferably from 20 to 40 wt % of monomers selected from the group consisting methyl acrylate, ethyl acrylate and mixtures thereof. It is particularly preferred if the ethylenically unsaturated monomers comprises from above 10 to 50 wt %, most preferably from 15 to 50, wt % particularly most preferably from 20 to 40 wt % of methyl acrylate.

If included, esters of methacrylic acid may, for example, be one or more of methyl methacrylate, isobornyl methacrylate, ethyl methacrylate, butyl methacrylate or hydroxyethylmethacrylate, of which methyl methacrylate is particularly preferred.

It is preferred that the ethylenically unsaturated monomers are substantially free from vinylidene chloride. If included, the amount thereof is preferably less than 10 wt %, most preferably less than 5 wt %, or even less than 1 wt % of the ethylenically unsaturated monomers. It is also preferred that the ethylenically unsaturated monomers are substantially free from any halogen containing monomers. If included, the amount thereof is preferably less than 10 wt %, most preferably less than 5 wt %, or even less than 1 wt % of the ethylenically unsaturated monomers.

Preferably the ethylenically unsaturated monomers comprise small amounts of one or more crosslinking multifunctional monomers, such as one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, dipentaerythritol hexa(meth)acrylate, triallylformal tri(meth)acrylate, allyl methacrylate, trimethylol propane tri(meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate etc. Particularly preferred are crosslinking monomers that are at least tri-functional, examples of which include pentaerythritol tri(meth)acrylate, pentaerythritol tetra(meth)acrylate, dipentaerythritol hexa(meth)acrylate, triallylformal tri(meth)acrylate, trimethylol propane tri(meth)acrylate, triacryl formal, triallyl isocyanate and triallyl isocyanurate. The amounts of crosslinking functional monomers may, for example, be from 0.1 to 10 wt % or from 0.1 to 1 wt % or from 1 to 3 wt % of the ethylenically unsaturated monomers, 0.1 to 1 wt % being particularly preferred in case the one or more multifunctional monomers are at least tri-functional and 1 to 3 wt % being particularly preferred in case the one or more multifunctional monomers are di-functional.

If ethylenically unsaturated monomers other than acrylonitrile, methacrylonitrile, monomers selected from the group consisting of esters of acrylic acid, esters of methacrylic acid and mixtures thereof, and one or more crosslinking multifunctional monomers, are included, the amount thereof is preferably from 0 to 10 wt %, most preferably from 0 to 5 wt %. Examples of such other kinds of monomers that may be included are nitrile containing monomers such as α-ethoxyacrylonitrile, fumaronitrile or crotonitrile; vinyl pyridine; vinyl esters such as vinyl acetate; styrenes such as styrene, halogenated styrenes or α-methyl styrene; dienes such as butadiene, isoprene and chloroprene; unsaturated carboxylic compounds like acrylic acid, methacrylic acid and salts thereof; or other unsaturated monomers like acrylamide, methacrylamide or N-substituted maleimides.

In an embodiment of the invention the ethylenically unsaturated monomers substantially consist of acrylonitrile, methacrylonitrile, monomers selected from the group consisting of esters of acrylic acid, esters of methacrylic acid and mixtures thereof, and one or more crosslinking multifunctional monomers. In a particular embodiment thereof the ethylenically unsaturated monomers substantially consist of acrylonitrile, methacrylonitrile, monomers selected from the group consisting of esters of acrylic acid, preferably one or more of methyl acrylate or ethyl acrylate, and one or more crosslinking multifunctional monomers.

The softening temperature of the polymer shell, normally corresponding to its glass transition temperature ($T_g$), is preferably within the range from 0 to 100° C., most preferably from 30 to 90° C.

The propellant is a hydrocarbon or mixture of hydrocarbons preferably having a boiling temperature not higher than the softening temperature of the thermoplastic polymer shell. The boiling point at atmospheric pressure is preferably within the range from −50 to 100° C., most preferably from −20 to 50° C., particularly most preferably from −20 to 30° C. The propellant may consist substantially of at least one of methane, ethane, propane, isobutane, n-butane and neo-pentane, but may also additionally comprise one or more other hydrocarbons, for example in an amount from 0 to 50 wt % of the propellant. Examples of such hydrocarbons include, n-pentane, isopentane, cyclopentane, hexane, isohexane, neo-hexane, cyclohexane, heptane, isoheptane, octane and isooctane. Aside from them, other hydrocarbon types can also be used, such as petroleum ether, or chlorinated or fluorinated hydrocarbons, such as methyl chloride, methylene chloride, dichloroethane, dichloroethylene, trichloroethane, trichloroethylene, trichlorofluoromethane, perfluorinated hydrocarbons, fluorine containing ethers, etc. Preferred propellants comprise isobutane, alone or in a mixture with one or more other hydrocarbons. The amount of isobutane in the propellant is preferably from 50 to 100 wt %, most preferably from 75 to 100 wt %.

$T_{start}$ for the expandable microspheres is preferably from 50 to 110° C., most preferably from 70 to 100° C. $T_{max}$ for the expandable microspheres is preferably from 100 to 200° C., most preferably from 120 to 170° C.

Apart from the polymer shell and the propellant the microspheres may comprise further substances added during the production thereof, normally in an amount from 0 to 20 wt %, preferably from 1 to 10 wt %. Examples of such substances are solid suspending agents, such as one or more of starch, crosslinked polymers, gum agar, derivated cellulose like for example methyl cellulose, hydroxypropyl methylcellulose, hydroxyethylcellolose and carboxy methylcellulose, silica, colloidal clays like for example chalk and bentonite, and/or one or more salts, oxides or hydroxides of metals like Al, Ca, Mg, Ba, Fe, Zn, Ni and Mn, for example one or more of calcium phosphate, calcium carbonate, magnesium hydroxide, barium sulphate, calcium oxalate, and hydroxides of aluminium, iron, zinc, nickel or manganese. If present, these solid suspending agents are normally mainly located to the outer surface of the polymer shell. However, even if a suspending agent has been added during the production of the microspheres, this may have been washed off at a later stage and could thus be substantially absent from the final product.

The expandable microspheres preferably have a volume median diameter from 1 to 500 μm, more preferably from 5 to 50 μm, most preferably from 10 to 50 μm. The amount of propellant in the expandable microspheres is preferably from 5 to 40 wt %, more preferably from 10 to 40 wt %, most preferably from 15 to 40 wt %, particularly most preferably from 20 to 35 wt %.

The term expandable microspheres as used herein refers to expandable microspheres that have not previously been expanded, i.e. unexpanded expandable microspheres.

A further aspect of the invention concerns a process for the production of expandable thermoplastic microspheres as described above. The process comprises polymerising ethylenically unsaturated monomers as described above in a preferably aqueous suspension in the presence of a propellant as described above to yield microspheres comprising a polymer shell encapsulating said propellant. Regarding the kinds and amounts of monomers and propellant, the above description of the expandable microspheres is referred to. The production may follow the same principles as described in the earlier mentioned U.S. Pat. Nos. 3,615,972, 3,945,956, 4,287,308, 5,536,756, 6,235,800, 6,235,394 and 6,509,384, EP 486080, EP 1054034, EP 1288272 and EP1408097, WO 2004/072160 and JP Laid Open No. 1987-286534.

In an embodiment of the invention the microspheres are produced in a batchwise process and the polymerisation may then be conducted as described below in a reaction vessel. For 100 parts of monomer phase (suitably including monomers and propellant, the proportions of which determine proportions of monomers in the polymer shell and the amount of propellant in the final product), one or more polymerisation initiator, preferably in an amount from 0.1 to 5 parts, aqueous phase, preferably in an amount from 100 to 800 parts, and one or more preferably solid colloidal suspending agent, preferably in an amount from 1 to 20 parts, are mixed and homogenised. The size of the droplets of the monomer phase obtained determines the size of the final expandable microspheres in accordance with the principles described in e.g. U.S. Pat. No. 3,615,972, that can be applied for all similar production methods with various suspending agents. The temperature is suitably maintained from 40 to 90° C., preferably from 50 to 80° C., while the suitable pH depends on the suspending agent used. For example, a high pH, preferably from 5 to 12, most preferably from 6 to 10, is suitable if the suspending agent is selected from salts, oxides or hydroxides of metals like Ca, Mg, Ba, Zn, Ni and Mn, for example one or more of calcium phosphate, calcium carbonate, magnesium hydroxide, magnesium oxide, barium sulphate, calcium oxalate, and hydroxides of zinc, nickel or manganese. A low pH, preferably from 1 to 6, most preferably from 3 to 5, is suitable if the suspending agent is selected from starch, methyl cellulose, hydroxypropyl methylcellulose, hydroxypropyl methylcellulose, carboxy methylcellulose, gum agar, silica, colloidal clays, or oxide or hydroxide of aluminium or iron. Each one of the above agents has different optimal pH, depending on, for example, solubility data.

In order to enhance the effect of the suspending agent, it is also possible to add small amounts of one or more promoters, for example from 0.001 to 1 wt %. Usually, such promoters are organic materials and may, for example, be selected from one or more of water-soluble sulfonated polystyrenes, alginates, carboxymethylcellulose, tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, polyethylenimine, polyvinylalcohol, polyvinylpyrrolidone, polyvinylamine, amphoteric materials such as proteinaceous, materials like gelatin, glue, casein, albumin, glutin and the like, non-ionic materials like methoxycellulose, ionic materials normally classed as emulsifiers, such as soaps, alkyl sulfates and sulfonates and long chain quaternary ammonium compounds.

Conventional radical polymerisation may be used and initiators are suitably selected from one or more of organic peroxides such as dialkyl peroxides, diacyl peroxides, peroxy esters, peroxy dicarbonates, or azo compounds. Suitable initiators include dicetyl peroxydicarbonate, di(4-tert-butylcyclohexyl) peroxydicarbonate, dioctanoyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropylhydroxy dicarboxylate, 2,2'-azobis(2,4-dimethyl valeronitrile), 2,2'-azobis(isobutyronitrile), 1,1'-azobis(cyclohexane-1-carbonitrile), dimethyl 2,2'-azobis(2-methylpropionate), 2,2'-azobis[2-methyl-N-(2-hydroxyethyl)propionamide] and the like. It is also possible to initiate the polymerisation with radiation, such as high energy ionising radiation.

When the polymerisation is essentially complete, microspheres are normally obtained as an aqueous slurry or dispersion, which can be used as such or dewatered by any conventional means, such as bed filtering, filter pressing, leaf filtering, rotary filtering, belt filtering or centrifuging to obtain a so called wet cake. However, it is also possible to dry the microspheres by any conventional means, such as spray drying, shelf drying, tunnel drying, rotary drying, drum drying, pneumatic drying, turbo shelf drying, disc drying or fluidised bed-drying.

If appropriate, the microspheres may at any stage be treated to reduce the amount of residual unreacted monomers, for example by any of the procedures described in the earlier mentioned WO 2004/072160 or U.S. Pat. No. 4,287,308.

A further aspect of the invention concerns expanded microspheres obtained by expanding expandable microspheres as described above, for example to a particle diameter from 2 to 5 times larger than the diameter of the unexpanded microspheres. The density of the expanded microspheres may, for example, be from 0.005 to 0.06 g/cm$^3$. The expansion is effected by heating the expandable microspheres to a temperature above $T_{start}$. The upper temperature limit is set by when the microspheres start collapsing and depends on the exact composition of the polymer shell and the propellant. In most cases a temperature from 80° C. to 150° C. is suitable. The density of the expanded microspheres can be, controlled by selecting temperature and time for the heating. The expansion can be effected by any suitable means for heating in any suitable device, as described in e.g. EP 0348372, WO 004/056549 or WO 2006/009643.

The expandable and expanded microspheres of the invention are useful in various application such as paper making, printing inks (such as waterborne inks, solvent borne inks, plastisols, UV-curing inks etc. e.g. for textile, wall paper etc.), putties, sealants, toy-clays, underbody coatings, adhesives, debonding of adhesives, artificial leather, genuine leather, paint, non-woven materials, paper and board, coatings (e.g anti-slip coating etc.) for various materials such as paper, board, plastics, metals and textile, explosives, cable insulations, thermoplastics (such as polyethylene, polyvinyl chloride, and ethylene-vinylacetate) or thermoplastic elastomers (such as styrene-ethylene-butylene-styrene co-polymer, styrene-butadiene-styrene co-polymer, thermoplastic polyurethanes and thermoplastic polyolefins), styrene-butadiene rubber, natural rubber, vulcanized rubber, silicone rubbers, thermosetting polymers (such as epoxies, polyurethanes and polyesters). In some of these applications expanded microspheres are particularly advantageous, such as in putties, sealants, toy-clays, genuine leather, paint, explosives, cable insulations and thermosetting polymers (like epoxies, polyurethanes and polyesters). In some cases it is also possible to use a mixture of expanded and expandable microspheres of the invention, for example in underbody coatings, silicone rubbers and light weight foams.

Still a further aspect of the invention concerns an aqueous slurry comprising expandable thermoplastic microspheres as described above, preferably in an amount from 5 to 55 wt %, most preferably from 20 to 55 wt %. Such a slurry is useful for various applications of the expandable microspheres, including e.g. paper making. The slurry preferably also comprises at least one thickener, preferably compatible with paper making. Examples of such thickeners include at least partially water soluble polymers selected from the group consisting of starch, gums, celluloses, chitins, chitosans, glycans, galactans, pectins, mannans, dextrins, co-polymers made from monomers comprising acrylic acid or salts thereof (preferably up to 50 mol %, most preferably up to 20 mol % acrylic acid or salt thereof), homo- and co-polymers made from monomers comprising esters or amides of acrylic acid, homo and co-polymers made from monomers comprising methacrylic acid, esters or amides thereof, rubber latexes, poly (vinyl chloride) and copolymers, poly(vinyl esters) and co-polymers (e.g. with ethylene), poly(vinyl alcohol), polyamines, polyetyleneimine, polyethylene/polypropylene oxides, polyurethane, and aminoplast and phenoplast precondensates such as urea/formaldehyde, urea/melamine/formaldehyde or phenol/formaldehyde and polyamidoamine epichlorohydrin resins. Examples of suitable gums include guar gums, tamarind gums, locust bean gums, tare gums, karaya, okra, acacia, xanthan gums etc. and mixtures thereof, of which guar gums are particularly preferred. Examples of suitable celluloses include derivatives such as optionally chemically modified CMC (carboxymethyl cellulose) and cellulose ethers like EHEC (ethyl hydroxyethyl cellulose) and HEC (hydroxyethyl cellulose), and mixtures thereof. Chemically modified cellulose derivatives include, for example, those modified with various functional groups such as quaternary amines, other amines, sulphates, sulphonates, phosphates, phosphonates, polyethylene oxide and polypropylene oxide.

The at least partially water soluble polymer can be straight chained, branched or cross-linked. The average molecular weight can vary within wide limits, depending on the kind of polymer. In most cases the preferred average molecular weight is at least 500, more preferably at least 2000 and most preferably at least 5000. The upper limit is not critical and in most cases the average molecular weight is preferably up to 50 000 000, more preferably up to 10 000 000, most preferably up to 1 000 000.

Particularly preferred polymers include starch, CMC, EHEC, Guar gum, polyamidoamine epichlorohydrin resins, co-polymers of acrylic acid with other monomers (e.g. with acrylamide), and homo- or co-polymers of polyacrylamides, polyamine, poly(vinyl alcohol) and polyethylene/polypropylene oxides.

One or more at least partially water soluble polymers effective as thickener are preferably present in an amount to stabilise the slurry against substantial sedimentation or flotation of the microspheres to an extent that they cannot be re-dispersed again. In many cases this can be achieved by adding sufficient polymer to obtain a preferred viscosity of the slurry from about 150 to about 1000 mPas at 25° C., most preferably from about 200 to about 600 mPas at 25° C. (refers to measurement with an Anton Paar DV-1P viscosimeter equipped with a spindle L3). The amount required to stabilise the slurry depends on the polymer and other circumstances such as the pH. In many cases a preferred content of at least partially water soluble polymer in the slurry is from about 0.1 to about 15 wt %, most preferably from about 0.1 to about 10 wt %, particularly most preferably from about 0.5 to about 10 wt %.

All thickeners and other additives disclosed in any of the earlier mentioned WO 2006/068573 and WO 2006/068574 may be used in the aqueous slurry of the invention in the preferred amounts also disclosed therein.

Particular aspects of the invention relates to the use of expandable microspheres as described above in printing inks and in the production of paper from a stock containing cellulosic fibres, artificial leather and nonwoven.

When used in printing inks, in particular water borne printing inks, the expandable microspheres, preferably wet unexpanded microspheres, are added to standard formulations well known to those skilled in the art. Such formulations usually include one or more binders and one or more thickeners. Other components may include, for example, pigments, anti-foaming agents, fillers, chemicals for preventing skinning or clogging, etc. Printing inks may also be based on acrylate dispersions or plastisols comprising expandable microspheres. After printing, the microspheres are expanded by heating, before, during or after the drying of the ink. Such printing inks are particularly suitable for printing on textiles or wallpaper.

When used in artificial leather, the expandable microspheres, preferably dry unexpanded microspheres, are used in standard formulations in standard procedures known to those skilled in the art, for example in the surface layer of multilayer artificial leather, for example of suede type or any other kind of structure. The artificial leather can be produced by any standard process, such as Release paper process, Direct coating of woven or non-woven, or the Coagulation process, from any standard material such polyurethane (PU), polyvinyl chloride (PVC) and mixtures thereof. Usually, artificial leather produced by any of the above processes is coated with PU or PVC paste containing expandable microspheres and is then heated to expand the microspheres.

In production of paper the expandable microspheres are preferably used to increase the bulk of the paper, but may alternatively serve other purposes. The microspheres are then preferably added to a stock containing cellulosic fibres, which then is dewatered and dried, wherein the microspheres expand. In most cases the expansion contributes to increasing the bulk of the paper.

A special aspect of the invention relates to a process for the production of paper comprising the steps of adding thermally expandable microspheres as described above to a stock containing cellulosic fibres, dewatering the stock on a wire to obtain paper, and drying the paper by applying heat and thereby also raising the temperature of the microspheres sufficiently for them to expand and increase the bulk of the paper. The amount of expandable microspheres added to the stock is preferably from 0.1 to 20 wt %, most preferably from 0.2 to 10 wt % dry microspheres of the dry content in the stock. Any kind of paper machine known in the art can be used.

The term "paper", as used herein, is meant to include all types of cellulose-based products in sheet or web form, including, for example, board, cardboard and paper board. The invention has been found particularly advantageous for the production of board, cardboard and paper board, particularly with a basis weight from 50 to 1000 g/m$^2$, preferably from 150 to 800 g/m$^2$.

The paper may be produced as a single layer or a multi-layer paper. If the paper comprises three or more layers, the expandable microspheres may be added to the portions of the stock forming one or several of these layers, for example only to the portions of the stock not forming any of the two outer layers.

The stock preferably contains from 50 to 100 wt %, most preferably from 70 to 100 wt % of cellulosic fibres, based on dry material. Before dewatering, the stock besides expandable microspheres, may also contain one or more fillers, e.g. mineral fillers like kaolin, china clay, titanium dioxide, gypsum, talc, chalk, ground marble or precipitated calcium carbonate, and optionally other commonly used additives, such as retention aids, sizing agents, aluminium compounds, dyes, wet-strength resins, optical brightening agents, etc. Examples of aluminium compounds include alum, aluminates and poly-aluminium compounds, e.g. polyaluminium chlor-ides and sulphates. Examples of retention aids include cationic polymers, anionic inorganic materials in combination with organic polymers, e.g. bentonite in combination with cationic polymers or silica-based sols in combination with cationic polymers or cationic and anionic polymers. Examples of sizing agents include cellulose reactive sizes such as alkyl ketene dimers and alkenyl succinic anhydride, and cellulose non-reactive sizes such as rosin, starch and other polymeric sizes like copolymers of styrene with vinyl monomers such as maleic anhydride, acrylic acid and its alkyl esters, acrylamide, etc.

At drying, the paper, and thereby also the microspheres, is preferably heated to a temperature from 50 to 150° C., most preferably from 60 to 110° C. This results in expansion of the microspheres and thereby also a bulk increase of the paper. The magnitude of this bulk increase depends on various factors, such as the origin of cellulosic fibres and other components in the stock, but is in most cases from 5 to 70% or more per weight percentage of retained microspheres in the dried paper, compared to the same kind of paper produced without addition of expandable microspheres or any other expansion agent. Any conventional means of drying involving transferring heat to the piper can be applied, such as contact drying (e.g. by heated cylinders), forced convection drying (e.g. by hot air), infrared techniques, or combinations thereof. In the case of contact drying, the temperature of the contact surfaces, e.g. the cylinders, is preferably from 20 to 150° C., most preferably from 30 to 130° C. The paper may pass a series of several cylinders, e.g. up to 20 or more, of increasing temperature.

The cellulosic fibres in the stock may, for example, come from pulp made from any kind of plants, preferably wood, such as hardwood and softwood. The cellulosic fibres may also partly or fully originate from recycled paper, in which case the invention has been found to give unexpectedly good results.

The expandable microspheres can be added in any form, although it from a practical point of view is most preferred to add them in the form, of an aqueous slurry as described above.

The invention will be further described in connection with the following Examples which, however, are not to be interpreted to limit the scope of the invention. If not otherwise stated, all parts and percentages refer to parts and percent by weight.

The expansion properties of the microspheres were evaluated on a Mettler TMA 40 with a TC15 TA processor and a PC with STAR$^e$ software using a heating rate of 20° C./min and a load (net.) of 0.06 N. $T_{start}$ is the temperature at which the expansion starts, $T_{max}$ is the temperature at which maximum expansion is obtained and TMA-density is the density of the microspheres at $T_{max}$.

The particle size and size distribution was determined by laser light scattering on a Malvern Mastersizer Hydro 2000 SM apparatus on wet samples. The mean particle size is presented as the volume median diameter d(0.5).

The amount of propellant was determined by thermal gravimetric analysis (TGA) on a Mettler Toledo TGA/SDTA851e. All samples were dried prior to analysis in order to exclude as much moisture as possible and if present also residual monomers. The analyses were performed under an atmosphere of nitrogen using a heating rate at 20° C. min$^{-1}$ starting at 30° C.

EXAMPLE 1

A reaction mixture containing Mg(OH)$_2$-stabilised organic droplets in water was created by mixing the phases and stirring vigorously until a suitable droplet size had been achieved. The water dispersion contained 3.2 parts of Mg(OH)$_2$ and 331 parts of water. The organic droplets contained 2.0 parts of dilaurylperoxide, 38 parts of isobutane, 52.0 parts of acrylonitrile, 28.0 parts of methacrylonitrile, 20.0 parts of methyl acrylate and 0.3 parts of trimethylolpropane trimethacrylate. Polymerisation was performed at 62° C. in a sealed reactor under agitation. After cooling to room temperature a sample of the obtained microsphere slurry was removed for determination of the particle size distribution. After filtration, washing and drying the particles were analysed by TMA. The dry particles contained about 23% by weight of isobutane and had a mean particle size of about 34 μm. The TMA-results are found in Table 1.

EXAMPLES 2-24

Microspheres were prepared in a plurality of polymerisation experiments performed as in Example 1 except for monomers and propellants, which were added according to Table 1. The amounts of water and Mg(OH)$_2$ in the examples varied between 235-365 parts and 2.2-4.8 parts respectively. This is due to small differences in the recipes in different polymerisation reactors but does not influence the thermal properties of the polymerised particles. In Examples 3, 4, 7 and 10, prior to handling the particles outside the reactor, the amount of residual monomers was reduced by treatment with 6 parts NaHSO$_3$ for 5 hrs at 70° C., after which the temperature was lowered to room temperature and the particles were isolated and analysed. In Example 2 the amount of residual monomers was reduced by treatment with 3.5 parts NaHSO$_3$ and in Examples 18 and 22 with 1.4 parts NaHSO$_3$. In Example 17 the amount of residual monomers was reduced by treatment with 8.6 parts of 25% NH$_3$ and 30 parts of water for 1 hr at 70° C. followed by addition of 1.5 parts of (NH$_4$)$_2$S$_2$O$_8$ dissolved in 17 parts of water and continued reaction for 4 h at 70° C. after which the temperature was lowered to room temperature and the particles were isolated and analysed. Analytical results can be found in Table 1.

TABLE 1

Analytical results for Examples 1-24 and amounts of different chemicals used, expressed as parts per weight.

| Example | AN | MAN | X | IB | IP | Size (μm) | Propellant (wt %) | $T_{start}$ (° C.) | $T_{max}$ (° C.) | TMA-density (g/l) |
|---|---|---|---|---|---|---|---|---|---|---|
| 1, X = MA | 52 | 28 | 20 | 38 | — | 34 | 23 | 90 | 163 | 4.0 |
| 2, X = MA | 60 | 30 | 10 | 34 | — | 34 | 27 | 104 | 177 | 6.7 |
| 3, X = MA | 45 | 25 | 30 | 38 | — | 40 | 22 | 93 | 151 | 5.2 |
| 4, X = MA | 60 | 20 | 20 | 38 | — | 36 | 21 | 97 | 156 | 8.9 |
| 5, X = EA | 62 | 33 | 5 | 35 | — | 29 | 17 | 106 | 185 | 8.5 |
| 6, X = EA | 59 | 31 | 10 | 35 | — | 25 | 22 | 98 | 176 | 5.1 |
| 7, X = EA | 52 | 28 | 20 | 38 | — | 30 | 16 | 94 | 162 | 6.5 |
| 8, X = BA | 62 | 33 | 5 | 35 | — | 28 | 19 | 104 | 184 | 13.2 |
| 9, X = BA | 59 | 31 | 10 | 35 | — | 28 | 18 | 97 | 171 | 11.5 |
| 10, X = BA | 52 | 28 | 20 | 38 | — | 28 | 22 | 95 | 149 | 23.0 |
| 11, X = MMA | 52 | 28 | 20 | 38 | — | 25 | 20 | 92 | 157 | 5.3 |
| 12, X = EMA | 52 | 28 | 20 | 38 | — | 27 | 11 | 90 | 150 | 9.7 |
| 13, X = BMA | 52 | 28 | 20 | 38 | — | 25 | 12 | 94 | 137 | 45.4 |
| 14 | 65 | 35 | — | — | 35 | 32 | 25 | 115 | 185 | 5.2 |
| 15, X = MA | 52 | 28 | 20 | — | 23 | 34 | 19 | 121 | 156 | 7.2 |
| 16, X = MMA | 52 | 28 | 20 | — | 35 | 27 | 26 | 112 | 151 | 7.9 |
| 17 | 65 | 35 | — | 34 | — | 44 | 25 | 113 | 186 | 8.4 |
| 18, X = MA | 52 | 28 | 20 | 33 | — | 12 | 21 | 100 | 141 | 9.1 |

TABLE 1-continued

Analytical results for Examples 1-24 and amounts of different chemicals used, expressed as parts per weight.

| Example | AN | MAN | X | IB | IP | Size (μm) | Propellant (wt %) | $T_{start}$ (°C.) | $T_{max}$ (°C.) | TMA-density (g/l) |
|---|---|---|---|---|---|---|---|---|---|---|
| 19, X = MMA | 52 | 28 | 20 | 34 | — | 15 | 18 | 99 | 140 | 14.6 |
| 20, X = MA | 52 | 28 | 20 | 35 | — | 28 | 23 | 92 | 158 | 4.5 |
| 21, X = MA | 65 | 15 | 20 | 35 | — | 30 | 19 | 93 | 160 | 9.9 |
| 22, X = MA | 45 | 25 | 30 | 33 | — | 12 | 20 | 95 | 135 | 9.0 |
| 23, X = MA | 52 | 28 | 20 | 38 | — | 23 | 20 | 94 | 159 | 5.1 |
| 24, X = MA | 55 | 30 | 15 | 38 |  | 39 | 26 | 98 | 180 | 4.3 |

AN = acrylonitrile,
MAN = methacrylonitrile,
MA = methyl acrylate,
EA = ethyl acrylate,
BA = butyl acrylate,
MMA = methyl methacrylate,
EMA = ethyl methacrylate,
BMA = butyl methacrylate,
IB = isobutane,
IP = isopentane The brightness of the dry microspheres from Examples 18 and 19 was analysed according to ISO 2470 with a Zeiss Elrepho Reflectometer; measurement of diffuse blue reflectance factor, light with a wavelength of 457 nm and using reference paper 59.65. However, due to the need of a sample holder for powders, the reflectance of the microspheres could only be measured through a glass disc, giving a decrease of the reflectance of about 11% (units of percent). Thus, the numbers are given with the reduction of the reflectance included, meaning that the two values for the brightness are about 11 units of percent higher. As Reference a commercial microsphere product was used having a polymer shell of 58% vinylidene chloride, 33% acrylonitrile and 9% methyl methacrylate and isobutane as propellant. The results can be found in Table 2.

TABLE 2

Brightness of microspheres

|  | Brightness (%) |
|---|---|
| Example 18 | 75.9 |
| Example 19 | 78.6 |
| Reference | 60.1 |

Dry microspheres from Examples 20 and 21 were tested in respect of solvent resistance. Each sample was mixed with a solvent mixture consisting of 2-butanone and DMF (90/10 w/w) and maintained for 7 days at room temperature. After this treatment the microspheres were filtrated and dried and analysed with TMA again to see how the expansion behaviour had been affected. As a Reference, a commercial microsphere product having a polymer shell of 22% vinylidene chloride, 60% acrylonitrile and 18% methyl methacrylate and isobutane as propellant was treated the same way. The results are shown in Table 3.

TABLE 3

Resistance against a mixture of 2-butanone/DMF 90/10

| | Expansion before exposure to solvent | | | Expansion after exposure to solvent during 1 week | | | |
|---|---|---|---|---|---|---|---|
| Microspheres | $T_{start}$ (°C.) | $T_{max}$ (°C.) | TMA-density (g/l) | $T_{start}$ (°C.) | $T_{max}$ (°C.) | TMA-density (g/l) | Comment |
| Example 20 | 92 | 158 | 4.5 | 73 | 161 | 44.9 | |
| Example 21 | 93 | 160 | 9.9 | 97 | 161 | 13.6 | |
| Reference | 99 | 150 | 12.3 | 107 | 148 | 106.2 | Collapses |

It appears that the microspheres of the invention are considerably less affected by the solvent mixture than the Reference microspheres made from high amounts of vinylidene chloride monomers. It can also be seen that the microspheres of Example 21 made from higher content of acrylonitrile monomers have the best solvent resistance.

EXAMPLE 25

A single layer paper board with a basis weight of about 300 g/m² was produced in a pilot paper machine with a machine speed of 4 m/min and not having recirculated process water. The pulp was composed of 42.5 wt % hardwood, 42.5 wt % softwood pulp and 15.0 wt % filler of GCC (ground calcium carbonate) and was beaten to a Schopper-Riegler value of 25° SR and then dispersed to give a pulp slurry/stock. An aqueous slurry of expandable microspheres was before the mixing box added to the stock in an amount of about 2.0 wt % dry microspheres of the dry substance in the stock. As retention aid Compozil® was used and AKD was used as sizing agent. In the drying section the paper web was heated by cylinders having a temperature profile from 65 to 122° C. Expandable microspheres from Examples 3, 4, 18 and 22 were tested. Gohseran L-3266™ (sulfonic acid modified polyvinylalcohol) was added to the microsphere slurries to stabilise against flotation or sedimentation. Commercially available microsphere slurries, with microspheres having a polymer shell of 73% vinylidene chloride, 24% acrylonitrile and 3% methyl methacrylate and having isobutane as propellant, and with Solvitose C5™ (starch) from Avebe Starches North Europe as thickening agent, were tested as Reference microspheres. In order to determine the retention of the microspheres, paper samples were taken before the press section for determination of the amount of microspheres (using GC). The retention was calculated from the microspheres addition and the content of microspheres in the paper. Moreover, samples from the dried paper were taken for determination of bulk and thickness. The results are shown in Table 4.

In the same way a single layer paper board with a basis weight of about 80 g/m² was produced. Microspheres of Examples 3 and 4 were tested along with the Reference microspheres. The results are shown in Table 5.

TABLE 4

Basis weight of about 300 g/m²

| AN/MAN/MA in polymer shell (wt %) | Amount of propellant (wt %) | Particle size (μm) | Retention (%) | Increased bulk (% per percentage of retained microspheres) |
|---|---|---|---|---|
| 45/25/30 (Ex. 22) | 20 | 12 | 28 | 20 |
| 52/28/20 (Ex. 18) | 21 | 12 | 21 | 10 |
| 45/25/30 (Ex. 3) | 22 | 40 | 39 | 71 |
| 60/20/20 (Ex. 4) | 21 | 36 | 50 | 54 |
| Ref 1 VDC/AN/MMA | 14 | 14 | 78 | 16 |
| Ref 2 VDC/AN/MMA | 17 | 20 | 70 | 23 |

AN = acrylonitrile,
MAN = methacrylonitrile,
MA = methyl acrylate,
VDC = vinylidene chloride,
MMA = methyl methacrylate

TABLE 5

Basis weight of about 80 g/m²

| AN/MAN/MA in polymer shell (wt %) | Amount of propellant (wt %) | Particle size (μm) | Retention (%) | Increased bulk (% per percentage of retained microspheres) |
|---|---|---|---|---|
| 45/25/30 (Ex. 3) | 22 | 40 | 47 | 59 |
| 60/20/20 (Ex. 4) | 21 | 36 | 44 | 72 |
| Ref 1 VDC/AN/MMA | 14 | 14 | 77 | 9 |
| Ref 2 VDC/AN/MMA | 17 | 20 | 57 | 21 |

AN = acrylonitrile,
MAN = methacrylonitrile,
MA = methyl acrylate,
VDC = vinylidene chloride,
MMA = methyl methacrylate The results show that the overall trend is that the increases of the bulk of the paper from the chlorine-free microspheres of the invention are comparable with the increases of the bulk from the chlorine containing microspheres. It also appears that a large particle diameter gives a very high increase of the bulk.

EXAMPLE 2

Microspheres from Examples 11 and 23 were tested in PVC plastisol by mixing 4% by weight of dry microspheres using a dissolver disc with a pre-mixed plastisol formulation consisting of 100 parts of PVC (Pevikon P 682 from Hydro), 57 parts of diisononyl phthalate, 3 parts of epoxidized soybean oil (Edenol D81 from Cognis), 1 part of barium-zinc stabilizer (Mark BZ 505 from Crompton), and 3 parts of butylbenzyl phthalate. Draw downs were made with a film applicator with a 250 μm gap. One of the draw downs was gelated at 100° C. for 45 sec and the thickness of this unexpanded draw down was 160 μm, measured with a coating thickness gauge, Elcometer 355 Standard. The other draw downs were expanded for 60 sec at 140-200° C. and the thicknesses were measured in the same way and the expansion factors were calculated by dividing with the thickness of the unexpanded layer. A Mathis labdryer hot air oven was used for both gelation and expansion. A Commercially available microsphere grade having a polymer shell of 58% acrylonitrile and 42% methyl methacrylate and having isobutane as propellant, was tested in the same way as. The expansion factors are presented in Table 6.

TABLE 6

Expansion factors for microspheres in PVC plastisol

| Temperature (° C.) | Example 11 | Example 23 | Reference |
|---|---|---|---|
| 140 | 2.3 | 3.7 | 1.8 |
| 150 | 3.4 | 4.8 | 2.3 |
| 160 | 4.1 | 5.3 | 2.6 |
| 170 | 4.3 | 5.6 | 2.5 |
| 180 | 4.3 | 5.9 | 2.4 |
| 190 | 4.6 | 5.9 | 2.3 |
| 200 | 4.7 | 5.6 | 2.1 |

The results show that the expansion factors of the plastisol from the microsphere of the invention are higher compared to the expansion factors from the reference microspheres.

The invention claimed is:

1. Thermally expandable thermoplastic microspheres comprising a polymer shell made from ethylenically unsaturated monomers encapsulating a propellant, said ethylenically unsaturated monomers consisting essentially of from 40 to 70 wt % of acylonitrile, from 5 to 40 wt % of methacrylonitrile, from above 20 to 50 wt % of acrylate monomers selected from the group consisting of methyl acrylate, ethyl acrylate and mixtures thereof, and from 0.1 to 10 wt % of one or more crosslinking multifunctional monomers, and said propellant consisting essentially of n-butane.

2. The microspheres as claimed in claim 1, wherein said ethylenically unsaturated monomers comprises from 45 to 65 wt % acrylonitrile.

3. The microspheres as claimed in claim 1, wherein said ethylenically unsaturated monomers comprises from 10 to 35 wt % of methacrylonitrile.

4. The microspheres as claimed in claim 1, wherein said acylate monomers are ethyl acrylate.

5. The microspheres as claimed in claim 1, wherein said acrylate monomers are methyl acrylate.

6. The microspheres as claimed in claim 1, wherein $T_{start}$ is from 50 to 110° C.

7. The thermally expandable thermoplastic microspheres according to claim 1, wherein said ethylenically unsaturated monomers consist essentially of from 45 to 65 wt % of acrylonitrile, from 10 to 35 wt % of methacrylonitrile, from above 20 to 40 wt % of acrylate monomers selected from the group consisting of methyl acrylate, ethyl acrylate and mixtures thereof, and from 0.1 to 10 wt % of one or more crosslinking multifunctional monomers.

8. Aqueous slurry comprising thermally expandable thermoplastic microspheres according to claim 1.

9. The aqueous slurry as claimed in claim 8 further comprising at least one thickener being an at least partially water soluble polymer selected from the group consisting of starch, gums, celluloses, chitins, chitosans, glycans, galactans, pectins, mannans, dextrins, co-polymers made from monomers comprising acrylic acid or salts thereof, homo- and co-polymers made from monomers comprising esters or amides of acrylic acid, homo and co-polymers made from monomers comprising methacrylic acid, esters or amides thereof, rubber latexes, poly(vinyl chloride) and copolymers, poly(vinyl esters) and co-polymers, poly(vinyl alcohol), polyamines, polyethyleneimine, polyethylene/polypropylene oxides, polyurethane, aminoplast, phenoplast precondensates and polyamidoamine epichlorohydrin resins.

10. Process for the production of thermally expandable microspheres comprising polymerising ethylenically unsaturated monomers in the presence of a propellant to yield microspheres comprising a polymer shell encapsulating said propellant, said ethylenically unsaturated monomers consisting essentially of from 40 to 70 wt % of acylonitrile, from 5 to 40 wt % of methacrylonitrile, from above 20 to 50 wt % of acylate monomers selected from the group consisting of methyl acrylate, ethyl acrylate and mixtures thereof, and from 0.1 to 10 wt % of one or more crosslinking multifunctional monomers, and said propellant consisting essentially of n-butane.

11. Expanded microspheres obtained by expending the thermally expandable thermoplastic microspheres according to claim 1.

12. Printing ink comprising the thermally expandable thermoplastic microspheres according to claim 1.

13. Process for the production of paper comprising the steps of adding thermally expandable thermoplastic microspheres to a stock containing cellulosic fibres, dewatering the stock on a wire to obtain paper, and drying the paper by applying heat and thereby also raising the temperature of the microspheres sufficiently for them to expand and increase the bulk of the paper, said expandable thermoplastic microspheres comprising a polymer shell made from ethylenically unsaturated monomers encapsulating a propellant, said ethylenically unsaturated monomers consisting essentially of from 40 to 70 wt % of acylonitrile, from 5 to 40 wt % of methacrylonitrile, and from above 20 to 50 wt % of acylate monomers selected from the group consisting of methyl acrylate, ethyl acrylate and mixtures thereof, and from 0.1 to 10 wt % of one or more crosslinking multifunctional monomers, and said propellent consisting essentially of n-butane.

14. The process as claimed in claim 13, wherein the thermally expandable microspheres are added in the form of an aqueous slurry comprising said thermally expandable microspheres.

15. The thermally expandable thermoplastic microspheres according to claim 1, wherein said ethylenically unsaturated monomers consist of from 40 to 70 wt % of acrylonitrile, from 5 to 40 wt % of methacrylonitrile, from above 20 to 50 wt % of acrylate monomers selected from the group consisting of methyl acrylate, ethyl acrylate and mixtures thereof, and from 0.1 to 10 wt % of one or more crosslinking multifunctional monomers.

* * * * *